US006385341B1

(12) United States Patent
Lisitsa et al.

(10) Patent No.: US 6,385,341 B1
(45) Date of Patent: *May 7, 2002

(54) TECHNIQUE FOR DECODING VARIABLE LENGTH DATA CODES

(75) Inventors: Rafael Lisitsa, Bellevue; Gregory Stepanets, Redmond, both of WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/843,933

(22) Filed: Apr. 17, 1997

(51) Int. Cl.[7] .................................................. G06K 9/46
(52) U.S. Cl. ........................ 382/233; 382/166; 382/233; 382/245; 382/246; 358/261.2; 358/261.4; 358/539
(58) Field of Search ................................. 382/233, 166, 382/238, 232, 234, 235, 246, 245; 358/261.2, 261.4, 427, 539, 426, 261.3; 341/67, 51, 107

(56) References Cited

U.S. PATENT DOCUMENTS

| 3,717,851 A | * | 2/1973 | Cocke et al. .................. 341/67 |
| 4,097,903 A | * | 6/1978 | Nakagome et al. .......... 358/261 |
| 4,168,513 A | * | 9/1979 | Hains et al. ............. 358/261.2 |
| 4,185,302 A | * | 1/1980 | Mounts et al. .............. 358/260 |
| 4,558,302 A | * | 12/1985 | Welch .......................... 341/51 |
| 4,606,069 A | * | 8/1986 | Johnsen ....................... 382/218 |
| 4,809,081 A | * | 2/1989 | Linehan ...................... 358/432 |
| 4,899,149 A | * | 2/1990 | Kahan .......................... 341/67 |
| 5,032,838 A | * | 7/1991 | Murayama et al. ............ 341/95 |
| 5,317,428 A | * | 5/1994 | Osawa et al. ................ 358/426 |
| 5,414,526 A | * | 5/1995 | Friedman ..................... 358/426 |
| 5,675,332 A | * | 10/1997 | Limberg ....................... 341/67 |

OTHER PUBLICATIONS

Dwu–Shian Ma et al., "programmable and parallel variable–length decoder for video systems", IEEE, pp. 448–454, Aug. 1993.*

* cited by examiner

Primary Examiner—Jayanti K. Patel
Assistant Examiner—Sheela Chawan
(74) Attorney, Agent, or Firm—Christensen O'Connor Johnson Kindness PLLC

(57) ABSTRACT

A system for the efficient decoding of data encoded with variable length codes uses an N-bit buffer as an index to a data look-up table or other suitable data structure. The encoded data is stored in an encoded data storage area and extracted N bits at a time. The N bits are used as an index or indicator to a location within the data look-up table. The contents of the data look-up table in the indicated location correspond to one or more decoded tokens and also provide an indication of the number of data bits from the N-bit buffer that were used to represent the decoded tokens. A pointer is incremented by the number and indicates a location within the encoded data storage area where the next N bits will be extracted and stored in the buffer. If the N-bit buffer is greater than or equal to the maximal length for the variable codes, at least one valid token is guaranteed as a result of a single data look-up operation. However, a data look-up operation typically results in a plurality of decoded tokens. In one embodiment, the decoding system is used for facsimile operation and may include additional data in the data look-up table to permit rapid decoding of two dimensional facsimile codes.

47 Claims, 7 Drawing Sheets

| INDEX (HEX) | DATA | | | | |
|---|---|---|---|---|---|
| 0001 | | | | | |
| 0002 | | | | | |
| ⋮ | ⋮ | | | | |
| 7273 | b2 | w128 | w2 | b5 | DATA USED = 15 BITS |
| 7274 | b2 | w128 | w2 | b1 | DATA USED = 14 BITS |
| ⋮ | ⋮ | | | | |

*Fig.5A.*

| INDEX (HEX) | DATA | | | | |
|---|---|---|---|---|---|
| 0001 | | | | | |
| 0002 | | | | | |
| ⋮ | ⋮ | | | | |
| 7273 | w6 | b1 | w2 | b5 | DATA USED = 15 BITS |
| 7274 | w6 | b1 | w2 | b1 | DATA USED = 14 BITS |
| ⋮ | ⋮ | | | | |

*Fig.5B.*

| INDEX | DATA | | |
|---|---|---|---|
| BYTE 1 | CONTROL CODE (1) | MSB $L_1$ (1) | BINARY CODE OF 1ST RESULT (6) |
| BYTE 2 | CONTROL CODE (1) | 2ND BIT $L_1$ (1) | BINARY CODE OF 2ND RESULT (6) |
| BYTE 3 | CONTROL CODE (1) | 3RD BIT $L_1$ (1) | BINARY CODE OF 3RD RESULT (6) |
| BYTE 4 | CONTROL CODE (1) | LSB $L_1$ (1) | BINARY CODE OF 4TH RESULT (6) |
| BYTE 5 | BINARY CODE OF $L_2$ (4) | | BINARY CODE OF TOTAL LENGTH (4) |

*Fig.6.*

TECHNIQUE FOR DECODING VARIABLE LENGTH DATA CODES

TECHNICAL FIELD

The present invention relates generally to variable length data codes, and more particularly, to a technique for efficient decoding of bit streams encoded with variable length codes.

BACKGROUND OF THE INVENTION

Variable length codes are known in the art, and are commonly used in applications, such as facsimile transmission, where a horizontal scan line comprises black and white pixels. Facsimile machines use variable length codes to represent the number of adjacent black or white pixels in a horizontal scan line. The number of adjacent pixels, sometimes called a "run," is represented as a separate set of variable length codes for black pixels and white pixels. Variable length codes are efficient for representing the number of pixels in a black run or a white run because the most frequently occurring runs of black and white pixels are represented by only a few data bits in the variable length code, while less frequently occurring runs of black and white pixels are represented by longer length codes. Therefore, on average, a message is represented by the fewest number of data bits since the most commonly occurring runs of black and white pixels are represented by the shortest variable length codes.

Decoding bit streams encoded with variable length codes is a tedious process. Because the code length is unknown, the conventional decoder uses a binary tree to search for valid outputs, which are sometimes called tokens. The data tokens are typically stored in a look-up table that require one data look-up operation for each bit in the variable length code. Thus, decoding bit streams encoded with variable length codes is an inefficient process. This is particularly troublesome when attempting to perform real time operations, such as converting from one facsimile encoding standard to a second facsimile encoding standard. Therefore, it can be appreciated that there is a significant need for a system and method for efficient decoding of bit streams encoded with variable length codes. The present invention provides this and other advantages as will be apparent from the following detailed description and accompanying figures.

SUMMARY OF THE INVENTION

The present invention is embodied in a system and method for the decoding of bit streams encoded with variable length codes. The system includes a buffer to store a predetermined number of data bits extracted from the encoded bit stream and a data structure containing decoded tokens corresponding to a decoded version of the extracted bits. The predetermined number of data bits in the buffer are indicative of a location in the data structure containing at least a portion of a decoded token corresponding to a portion of the predetermined number of extracted data bits. The portion of the decoded token may not use all of the predetermined number of extracted data bits. Therefore, the system may further include count means to determine a number corresponding to the portion of the predetermined number of extracted data bits to permit the extraction of additional encoded data so as to reform the predetermined number of data bits in the buffer for a subsequent look-up operation. The system may also include a data pointer to indicate a data location where the data encoded with variable length codes is stored such that the buffer stores the predetermined number of data bits extracted from the encoded data starting at the data location indicated by the pointer. The count means may adjust to the pointer by adding the number corresponding to the portion of predetermined number of data bits used in the previous data look-up operation. This permits the subsequent extraction of the predetermined number of data bits from the encoded bit stream starting at the data location indicated by the pointer.

In one embodiment, the structure itself may contain additional data indicative of the number corresponding to the portion of the predetermined number of data bits such that the count means can use the additional data to permit the extraction of additional encoded data to reform the predetermined number of data bits in the buffer. The variable length codes have a maximum code length. In one embodiment, the predetermined number is at least as large as the maximum code length to guarantee the decoding of at least one token for each look-up operation, typically resulting, however, in retrieving multiple data tokens at once. In one embodiment, the decoding system may utilize a plurality of data structures each of which includes additional data indicative of which of the plurality of data structures will be used to decode next portion of encoded data.

The system may be readily employed in a computer where data is stored using a predetermined memory model. Under such a memory model, the data structures are constructed to use the predetermined memory model, thus minimizing data processing steps. The system may also be used with facsimile technology where the data encoded with variable length codes are facsimile data and the decoded tokens correspond to pixel data in a facsimile image. In this embodiment, the decoded tokens correspond to black pixel data and white pixel data and the data look-up table may comprise a black look-up table for use when the last decoded token was a white terminating token and a white look-up table for use when the last decoded token was a black terminating token. In one embodiment for facsimile operation, the facsimile look-up tables may include additional data to permit rapid decoding of two dimensional facsimile codes.

BRIEF DESCRIPTION OF THE DRAWINGS

FIG. 5A illustrates the use of a black data table for decoding a portion of facsimile data when the system of FIG. 2 is used for facsimile operation.

FIG. 5B illustrates the use of a white data table for decoding a portion of facsimile data when the system of FIG. 2 is used for facsimile operation.

FIG. 6 illustrates the specific data structure used by the system of FIG. 2 for facsimile operation with two dimensional coding.

DETAILED DESCRIPTION OF THE INVENTION

The present invention provides an efficient technique for decoding bit streams encoded with variable length codes. A number of data bits from the bit stream encoded with variable length code are used to indicate a location in a data structure. The data structure location contains data corresponding to one or more decoded tokens.

Variable length codes provide an efficient technique for encoding data, but conventional techniques for decoding bit streams encoded with variable length codes are inefficient. One technology in which variable length codes are used is facsimile data encoding. As is known in the art, facsimile data may be encoded in three different formats. Modified Huffman (MH) code is a one dimensional encoding format. Modified Read (MR) code and Modified Modified Read (MMR) code are both two dimensional encoding formats. The definition of the facsimile codes, and facsimile operation in general, is governed by international standards, such as the International Telegraph and Telephone Consultative Committee (CCITT) published by the International Telecommunications Union. The various references to facsimile communications and facsimile encoding techniques are well known, and need not be described in detail herein.

As is known in the art, there are several different types of variable length facsimile codes. One type of variable length facsimile code, known as terminating codes, indicate run lengths of black and white pixels ranging from 0 pixels to 63 pixels in length. Make-up facsimile codes are used to represent black and white pixel run lengths in multiples of 64 pixels. An end of line (EOL) facsimile code indicates the end of a horizontal scan line. Each horizontal scan line starts with an imaginary white pixel, and always ends with an EOL code. The remaining pixels in a horizontal scan line are represented by terminating codes and make-up codes. The CCITT standard also defines the use of "fill bits" to increase the code length so that each horizontal scan line requires a minimum transmission time. The minimum transmission time is required by older facsimile machines. For example, a scan line of all white pixels may be represented by a single make-up code, a single terminating code, and an EOL code. However, the transmission of only these minimal codes would be less than the minimum transmission time for a horizontal scan line. Therefore, the CCITT standard uses a series of zeros as fill bits to increase the code length for the horizontal scan line.

Figure 1:
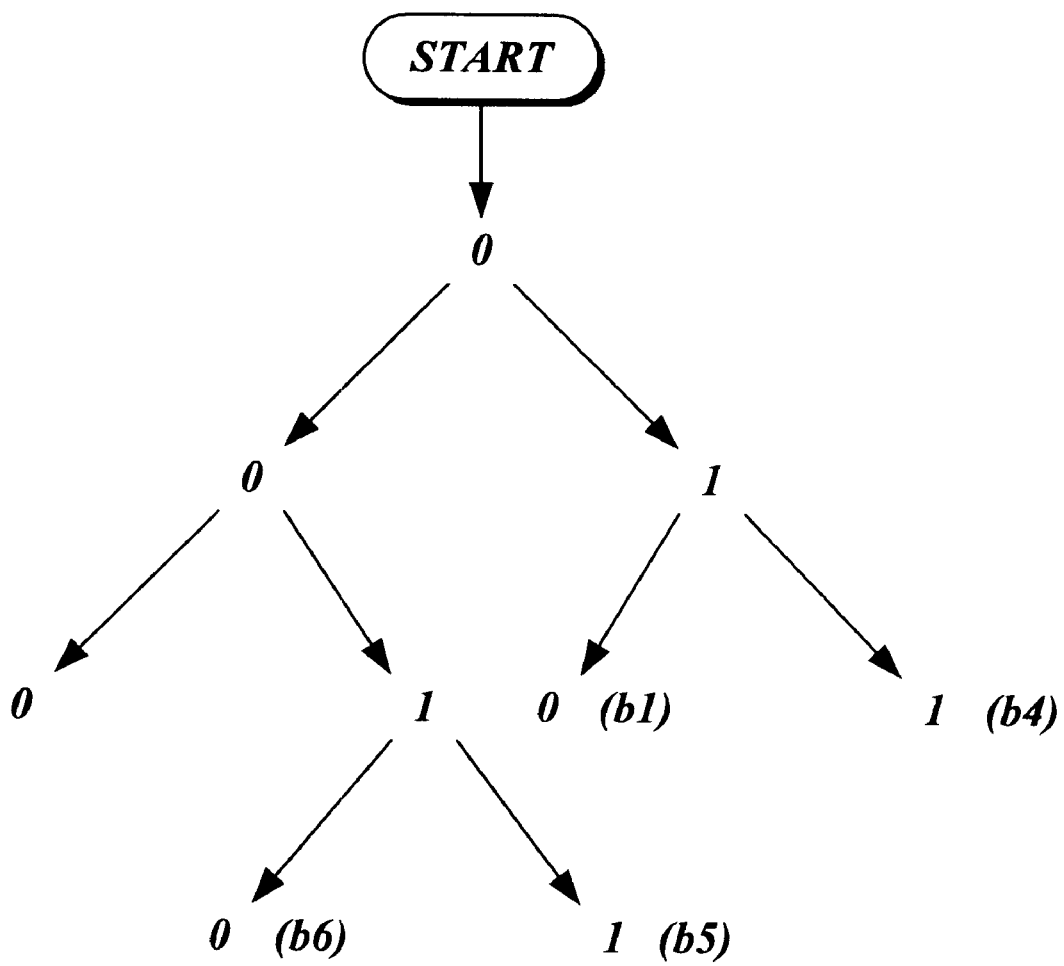
FIG. 1 depicts a binary search tree used by conventional systems to decode variable length codes.

FIG. 1 illustrates the use of a binary tree to decode variable length codes in a conventional manner. As discussed above, each horizontal scan line begins with an imaginary white pixel. Therefore, each horizontal scan line will begin with decoding of a run length of white pixels. As is clearly understood by those of ordinary skill in the art, pixel run lengths in a horizontal scan line alternate between white pixels and black pixels. The facsimile machine knows what pixel color a run length will have based on the pixel color of the previous pixel run. In the example of FIG. 1, the binary tree is used to decode a run of black pixels. The conventional decoding technique retrieves a single data bit, which is a 0 in the example of FIG. 1. A single data bit does not correspond to any valid output (i.e., token). Therefore, the conventional decoder retrieves the next binary data bit and adds it to the existing bit. If the following binary data bit is a 1 (i.e., a combination of 01), there is still no valid token corresponding to the variable length code 01. Therefore, the conventional decoder retrieves the next bit of the variable length code and adds it to the existing bits. If the next bit is a logic 0 (i.e., 010), this represents a run length of one black pixel. Conversely, if the retrieved bit is a logic 1 (i.e., 011), this corresponds to a run of four black pixels. The decoding process halts whenever a valid token is detected. Thus, if three data bits (e.g., 011) were detected, this indicates a terminating code of four black pixels. Therefore, a conventional facsimile machine will insert four black pixels on the scan line and begin to decode the variable length code for a white pixel token or EOL code. The conventional decoder will retrieve the data bits in the variable length code and attempt to decode terminating codes or make-up codes for black and white pixels until an EOL code is detected.

As is apparent from the above description, the conventional variable length decoder processes each data bit in the variable length code in a serial fashion and performs a table look-up for each data bit that is retrieved until a valid token is detected. As is known to those of ordinary skill in the art, data look-up operations are time consuming. This is especially important in some forms of communication, such as facsimile communication, where real time decoding is essential. For example, with a T.30 facsimile protocol, a receiver must acknowledge that a page of data is valid in less than three seconds. Therefore, a facsimile machine must receive data and decode the data for an entire page in less than three seconds in order to verify that the data for that page is valid. This verification process can require thousands of data look-up operations for a single page of facsimile data.

In contrast to the conventional decoding techniques, the present invention permits the efficient decoding of bit streams encoded with variable length data codes. While the examples presented herein are directed to facsimile encoding, it is clear that the techniques of the present invention are applicable to any variable length codes. Therefore, the present invention is not limited to facsimile operation. The present invention may be incorporated into independent devices, such as facsimile machines or incorporated into a computer, and is applicable to the decoding of any bit stream encoded with variable length codes. In a preferred embodiment of the present invention, each data look-up operation results in at least one decoded token. However, each data look-up operation typically results in three decoded tokens on average.

Figure 2:
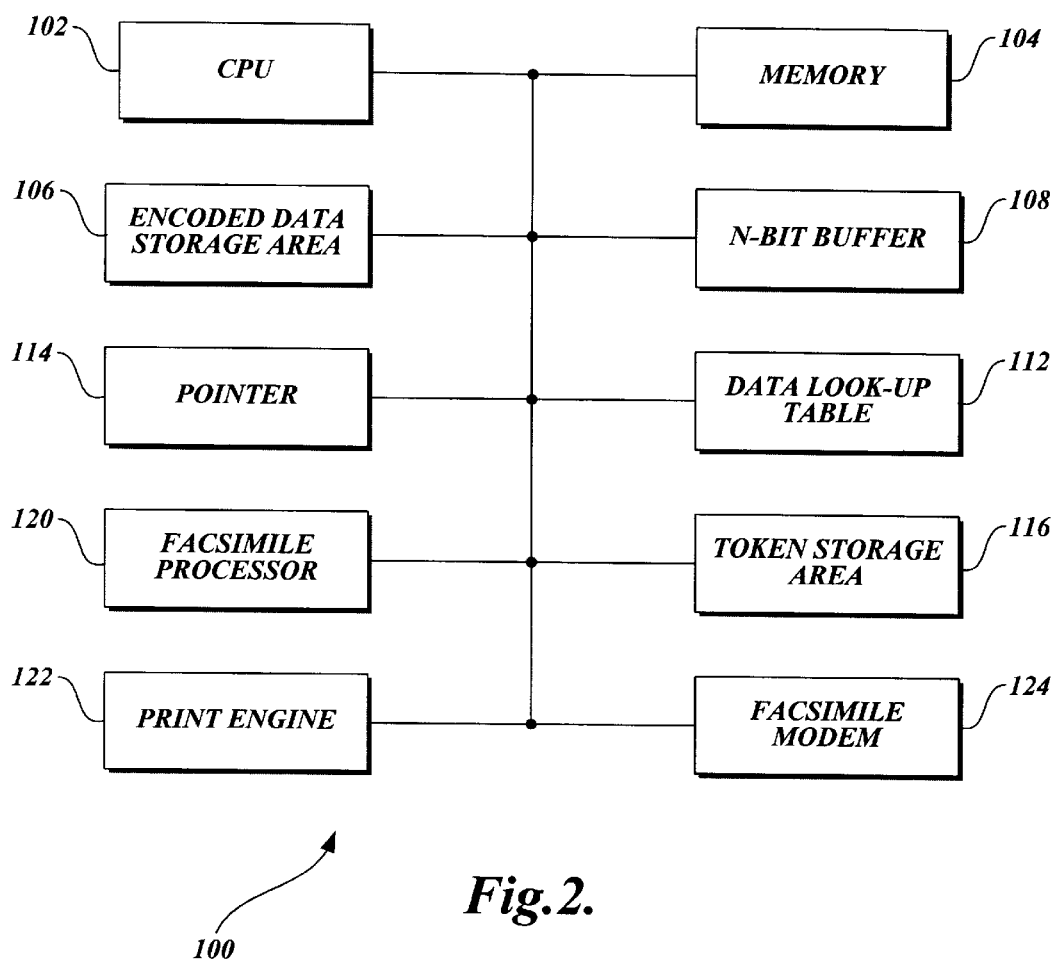
FIG. 2 is a functional block diagram of an illustrative embodiment of the present invention.

The present invention is embodied in a system 100 illustrated in the functional block diagram of FIG. 2. The system 100 includes a central processing unit 102, which may be a conventional microprocessor, embedded controller, customized microprocessor, or the like. The CPU is coupled to a memory 104, which may include both read only memory (ROM) and random access memory (RAM). Also included in the system 100 is an encoded data storage area 106. The encoded data storage area 106 may be a portion of the memory 104, or a separate storage device, such as a disk drive. The encoded data in the encoded data storage area 106 may, for example, constitute a page of a document that has been transmitted via facsimile. An N-bit buffer 108 extracts up to N bits of encoded data from the encoded data storage area 106. As will be described in greater detail below, the N-bit buffer 108 is used as an index or indicator to a location in a data look-up table 112. It should be noted that the system 100 may be embodied in a single facsimile machine or incorporated into a computer.

The N-bit buffer 108 contains N data bits. In a preferred embodiment, the length N is selected to be greater than or equal to the maximum code length in the variable length code system. For example, if the maximum code length is 15 data bits, using a 15-bit buffer as an index to the data look-up table 112 guarantees at least one decoded token for each data look-up operation. However, use of a 15-bit buffer will generally result in more than one decoded token for each look-up operation. For example, the maximum code length in facsimile operation is 13 bits. Tests have indicated that the 15-bit buffer results in an average of three data tokens per look-up operation in facsimile operation.

Figure 3A:
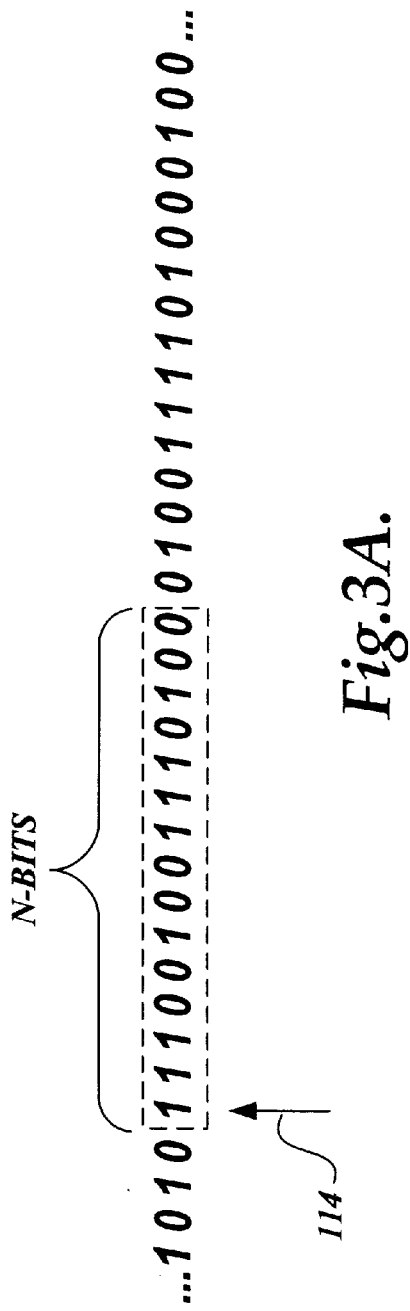
FIG. 3A illustrates the use of an N-bit indicator extracted from a bit stream encoded with variable length codes.

As discussed above, the N-bit buffer 108 is used as an index to the data look-up table 112. Details of the data look-up table 112 are provided below. As illustrated in FIG. 3A, a pointer 114 indicates the location in the encoded data storage area 106 where data has not yet been decoded. At the start of the decoding process, the pointer 114 points to the beginning of the encoded data storage area 106. In the example of FIG. 3A, the pointer 114 indicates a location within the middle of the bit stream encoded with variable length code in the encoded data storage area 106. The system 100 uses the N-bits starting at the location indicated by the pointer 114 as an index or indicator to the data look-up table 112. The N-bit buffer 108 has a value of 7274h (where "h" indicates hexadecimal data values) in the example of FIG. 3A. This index value indicates a location in the data look-up table 112 where one or more tokens associated with the index are stored. However, it should be noted that some bits in the N-bit buffer 108 may not correspond to valid decoded tokens. In the example of a 15-bit buffer, one data look-up operation may result in only fourteen data bits, for example. The remaining one data bit in the 15-bit data buffer is the one data bit of an undecoded token. Therefore, the one remaining data bit in the 15-bit buffer must be reanalyzed in conjunction with additional data bits extracted from the encoded data storage area 106.

Figure 3B:
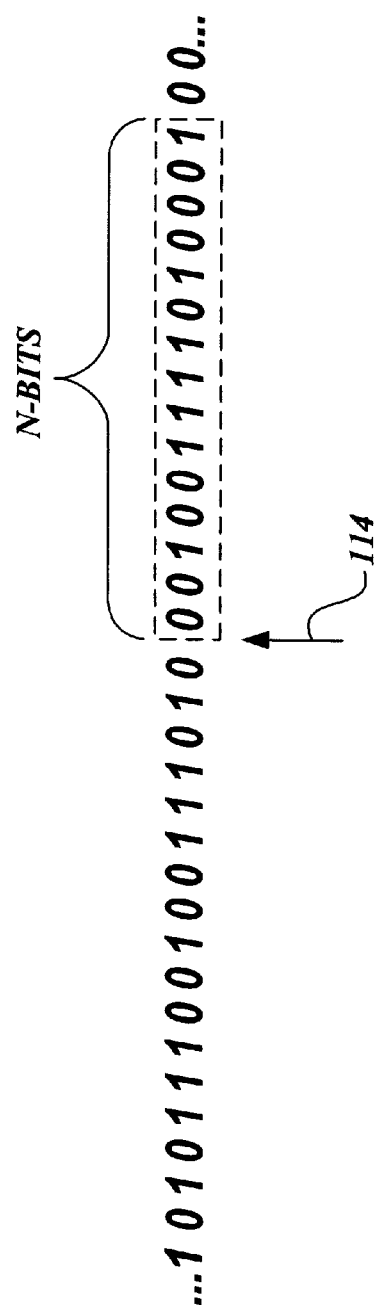
FIG. 3B illustrates the use of the indicator of FIG. 3A following a data look-up operation.

The pointer 114 is adjusted following a data table look-up operation to compensate for the number of unused bits in the N-bit buffer 108. In the example above, where only fourteen of fifteen data bits actually correspond to valid data tokens, the pointer 114 is adjusted by fourteen bits to compensate for the fourteen bits in the 15-bit buffer that correspond to the valid decoded tokens. This is illustrated in FIG. 3B where the pointer 114 has been shifted by fourteen data bits to point to a new location within the bit stream encoded with variable length codes stored in the encoded data storage area 106. In this manner, the next fifteen bits extracted from the encoded data storage area 106 will include the one unused data bit remaining from the previous data look-up operation. In the example of FIG. 3B, the new index value is 13D1h, which indicates the location in the data look-up table 112 where decoded tokens corresponding to the N-bits are stored.

A token storage area 116 is used to temporarily store the decoded tokens from the data look-up table 112. The decoded tokens can subsequently be processed by a facsimile processor 120 in a conventional manner and printed using a print engine 122. The operation of the facsimile processor 120 to print pixels on paper using a print engine 122 is well known in the art, and will not be described herein. The system 100 also includes an optional facsimile modem 124 to provide facsimile communications with remote locations. Data received by the facsimile modem 124 is stored in the encoded data storage area 106 until decoded in the manner described above. The various components of the system 100 are coupled together by a bus system 126, which may carry power, control signals, and status signals in addition to data. However, for the sake of brevity, these various bus elements are depicted by the bus system 126.

In addition to decoding data received by the facsimile modem 124, the system 100 advantageously allows the efficient conversion from one code format to another. For example, data is often stored in the encoded data storage area 106, such as a hard disk drive, in MMR format and must be converted to MH or MR for transmission by the facsimile modem 124. This process requires decoding the MMR data in the encoded data storage area 106 into tokens, which are then reencoded into the desired MH or MR data format. The efficient data processing of the system 100 allows such data conversions to be performed in real time.

The operation of the system 100, and details of the data look-up table 112, may now be provided. The encoded data storage area 106 contains a bit stream encoded with variable length code corresponding to a plurality of tokens. For each look-up operation, N bits of the bit stream encoded with variable length codes are extracted and placed in the N-bit buffer 108, which functions as an index to the data look-up table 112. Alternatively, the N-bits may be used directly from the encoded data storage area 106 and may be used directly as an index to the data look-up table 112, thus eliminating the need for the N-bit buffer 108. Such indexed look-up operations, where one memory location is used as an index to another memory location, are well known in the art and need not be described in greater detail herein. Thus, the system 100 performs an N-bit parallel look-up operation rather than the serial look-up processing known in the art. Any unused bits in the index are saved for the next look-up operation.

Figure 4:
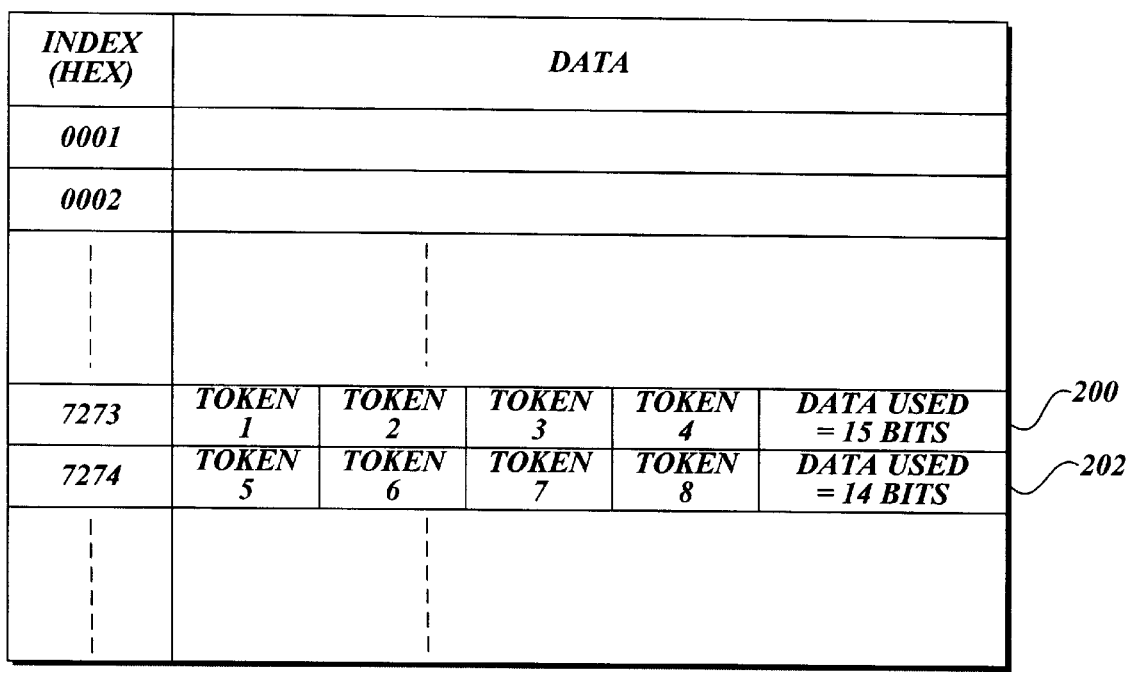
FIG. 4 illustrates one example of the data structure used in the data look-up table of the system of FIG. 2.

An example of the data look-up table 112 is provided in FIG. 4. The N-bit buffer 108 is used as an index and points to a location within the data look-up table. In one example, the N-bit buffer 108 has a data value of 7273h. This is an index indicating a location 200 in the data look-up table 112. The location 200 contains tokens that correspond to at least some of the data bits in the index. For example, the location 200 contains token 1, token 2, token 3, and token 4. The data location 200 also provides an indication of how many bits in the N-bit buffer 108 were used to decode the tokens token 1 to token 4. In the present example, location 200 indicates that fifteen data bits of the N-bit buffer 108 were used to decode the tokens token 1 to token 4. Therefore, the first fifteen bits of the N-bit buffer 108 correspond to valid decoded tokens. The remaining data bits, if any, are used to form the start of the next N bits in the N-bit buffer 108. However, in an exemplary embodiment, the pointer 114 is incremented by fifteen bits so that it points to the location in the encoded data storage area 106 (see FIG. 2) corresponding to the next data bit that has not been decoded into a valid token. Thus, the N-bit buffer data value 7273h decodes into four tokens (token 1 to token 4) and uses fifteen data bits. Therefore, the pointer 114 is incremented by fifteen bits and thus points to the location in the encoded data storage area 106 following the data bits corresponding to token 4. Thus, one data look-up operation provided four decoded tokens that correspond to some or all of the data bits in the N-bit buffer 108. The process is then repeated with the N-bit buffer extracting the next N bits starting at the location indicated by the pointer 114.

Similarly, if the N-bit buffer 108 contained the value 7274h as illustrated in FIG. 3A, a data location 202 in the data look-up table 112 would be accessed by the system 100. The location 202 contains token 5, token 6, token 7 and token 8, which are represented by the first fourteen data bits out of the N-bits in the N-bit buffer 108 (see FIG. 2). Thus, a single look-up operation to location 7274h in the data look-up table 112 provides four decoded tokens. The pointer 114 is incremented by fourteen bits, as illustrated in FIG. 3B, so that it points to the location in the encoded data storage area 106 corresponding to the data bit following token 8.

It should be noted that the data look-up table 112 has been described as a table per se. However, those of ordinary skill in the art will recognize that any suitable data structure may be used for the data look-up table 112. Therefore, the present invention is applicable to any suitable data structure and is not limited to a data look-up table. The following discussion provides examples of suitable data structures useful for decoding variable length facsimile data. However, as discussed above, the system 100 may be advantageously applied to any variable length code and is not limited to facsimile operation.

The CCITT standard for facsimile operation defines variable length codes for black pixels and white pixels. A particular string of data bits in the variable length code may correspond to a run length of black pixels or white pixels. For example, the data string 1110010 may correspond to a terminating code for a black pixel run length of 2 (ie., 11) followed by a white make-up code of 128 pixel run length (i.e., 10010). The same binary code sequence 1110010 may also correspond to a terminating code for a white pixel run length of 6 (i.e., 1110) followed by a terminating code for a black pixel run of one pixel (i.e., 010). However, the facsimile machine inherently knows whether the next run of pixels will be white pixels or black pixels based on the previously decoded variable length code. For example, if the previously decoded token was a terminating code indicating a run of black pixels, the next variable length code will correspond to a run of white pixels or an EOL code. In accordance with CCITT standards, each horizontal scan line begins with an imaginary white pixel. Therefore, each line begins with a run of white pixels followed by alternating runs of black pixels and white pixels. The conventional facsimile machine uses two different binary search trees for white and black pixel runs, respectively. Similarly, the system 100 starts decoding each horizontal scan line using the imaginary white pixel in accordance with the CCITT standards. Therefore, the sample bit stream encoded with variable length codes 1110010 will correspond to a terminating code for a black pixel run length of 2 followed by a make-up code for a white pixel run length of 128 if the previously decoded token corresponded to a white terminating code. In contrast, if the previously decoded token corresponded to a black terminating code, the bit stream encoded with variable length data codes 1110010 corresponds to a white terminating code with a run length of six pixels followed by a black terminating code with a run length of one pixel.

To simplify the data decoding process, the data look-up table 112 comprises a black pixel data look-up table 112a, shown in FIG. 5A, if the previously decoded token in a given horizontal scan line was a white terminating code and a white pixel data look-up table 112b, shown in FIG. 5B, at the start of each horizontal scan line or if the previously decoded token was a black terminating code. In the example illustrated in FIG. 5A, the N-bit buffer 108 is assumed to be a 15-bit index to the data look-up tables 112a and 112b. For example, the 15-bit buffer value 7273h points to a particular location 220 in the black pixel data look-up table 112a. The fifteen data bits comprising the data value 7273h correspond to a black terminating code with a pixel run length of 2, designated herein by the abbreviation b2, followed by a white make-up code with a pixel run length of 128, designated herein by the abbreviation w128, followed by a white terminating code with a pixel run length of 2 (i.e., w2), followed by a black terminating code with a black pixel run length of 5 (i.e., b5). Thus, a single data look-up operation resulted in four decoded tokens. The conventional binary search tree would require fifteen data look-up operations to achieve the same result. It should be noted that all fifteen data bits of the N-bit buffer 108 are used to decode the four tokens in the data location 220. Therefore, the pointer 114 (see FIG. 2) will be incremented by fifteen bits to point to the data location in the encoded data storage area 106 following the bit stream encoded with variable length codes corresponding to the decoded tokens. Similarly, the value 7274h in the N-bit buffer 108 points to a data location 222 within the black pixel data look-up table 112a. The data within the data location 222 corresponds to the data tokens b2, w128, w2, and b1. In this example, a single data look-up operation resulted in four decoded tokens. It should be noted that only fourteen data bits of the N-bit buffer 108 are used to decode the four tokens in the data location 222. The remaining one data bit of the N-bit buffer 108 does not correspond to any valid token. Therefore, the pointer 114 is incremented by fourteen bits so that it now points to a location in the encoded data storage area 106 corresponding to the next data bit in the variable length string to be decoded.

FIG. 5B illustrates the operation of the data look-up table 112 if the next decoded token corresponds to a run length of white pixels. The value 7273h is used as an index to a particular data location 224 in the white pixel data look-up table 112b. The data code sequence 7273h corresponds to the pixel run lengths w6, b1, w2, b5. These tokens use all fifteen data bits of the N-bit buffer 108. Therefore, the pointer 114 (see FIG. 2) is incremented by fifteen bits to point to the next location in the encoded data storage area 106 following the last decoded data bit. It should be noted that a single look-up operation resulted in four decoded tokens. The conventional binary search would require fifteen look-up operations to provide the same data obtained in one look-up operation by the system 100. If the N-bit buffer 108 contained the index value 7274h, the white table portion 112b of the data look-up table 112 provides the decoded tokens w6, b1, w2, b1. This code sequence required fourteen data bits. Therefore, the pointer 114 is incremented by fourteen bits to point to the next location in the encoded data storage area 106 following the last decoded data bit. Thus, the system 100 advantageously provides a technique whereby multiple data tokens may be decoded with a single look-up operation. This permits real time conversion from one data format to another and assures satisfactory operation with the CCITT standards that require acceptance of a page of data in less than three seconds.

FIG. 6 illustrates the actual structure of the data look-up table 112 as implemented in one embodiment of the system 100 for facsimile operation. The black pixel data look-up table 112a (see FIG. 5A) and white pixel data look-up table 112b (see FIG. 5B) each have $2^{15}$=32768 entries. Each entry is a five-byte fixed-sized record describing up to four tokens as well as the total number of data bits consumed by all of the tokens. In addition, the five-byte record includes first and second run lengths, which are used for two dimensional encoding such as MR and MMR.

The first byte for a particular data entry contains a one-bit control code, the first bit (MSB) of a length $L_1$ and a six-bit binary code indicative of the first token. The second byte of the data entry also includes a one-bit control code, the second bit of length $L_1$, and a six-bit binary code representative of the second token. Similarly, bytes 3 and 4 contain a one-bit control code, the third bit and fourth bit (LSB) of length $L_1$, respectively, and six-bit binary codes with the third and fourth respective tokens. The fifth byte of the data entry contains a four-bit binary code indicative of a length $L_2$ and a four-bit binary code indicative of the total number of data bits from the N-bit buffer 108 (see FIG. 2) that were used to represent the tokens within the data entry. This total number of data bits is referred to herein as the total length.

The one-bit control code in each of the first four data bytes is indicative of the binary result code in the respective byte.

A control code=0 indicates that the current byte represents a terminal token where the six-bit binary code is the run length of the terminal code. The CCITT standard defines terminal codes from 0 to 63, which may be represented by the six-bit binary code. A control code=1 and binary result code<28 represents a valid make-up code. The corresponding run length is equal to the result code times sixty-four. A control code=1 and binary result code>28 is used by the system 100 to represent special cases encountered during the decoding process. The special cases used in the system 100 are illustrated in Table 1 below:

TABLE 1

| | | |
|---|---|---|
| ERROR_ENTRY | = 30 | . . . indicates an illegal bit-stream |
| EOL_FOUND | = 32 | . . . indicates EOL |
| EOL_AHEAD | = 31 | . . . indicates that EOL is ahead |
| NO_MORE_RECORDS | = 33 | . . . indicates that there are no more results for this entry. |

The data structure illustrated above does not contain actual decoded tokens, but binary codes indicative of the tokens. The token storage area 116 may store the binary data indicative of the decoded tokens. The facsimile processor 120 can readily convert the binary codes to pixel data. The techniques required to convert the binary data into pixel data are well within the knowledge of those of ordinary skill in the art and need not be described herein.

The total length is indicative of the number of bits within the N-bit buffer 108 (see FIG. 2) that are used to represent the one or more tokens in each five-byte data entry. The system 100 advances the pointer 114 by a value equal to the total length. That is, if a five-byte record provided one or more tokens and used ten data bits to represent the decoded tokens, the pointer 114 is advanced by ten bits so as to point to a subsequent location in the encoded data storage area 106 corresponding to the next undecoded bit in the bit stream encoded with variable length codes.

The lengths $L_1$ and $L_2$ represented in each data entry are used in horizontal mode coding in two-dimensional facsimile encoding. As is known to those of ordinary skill in the art, horizontal mode coding requires the encoding of multiple run lengths defined in the CCITT standard as $a_0a_1$ and $a_1a_2$. The length $a_0a_1$ represents a run length of a first color to a first transition point on the horizontal scan line while the distance $a_1a_2$ represents the distance on the horizontal scan line of a second, opposite color to a second transition point on the horizontal scan line. In the system 100, the value of length $L_1$ indicates the distance $a_0a_1$ while the value of length $L_2$ indicates the distance $a_0a_2$. With four bits allocated to represent $L_1$ and $L_2$, a maximum length of sixteen pixels may be represented by $L_1$ and $L_2$. While decoding an encoded bit stream that corresponds to a horizontal mode of two-dimensional facsimile code, the system 100 needs to compute the distance $a_0a_2$ in order to advance the pointer 114 to point to the next undecoded bit in the encoded data storage area 106. The distance $a_0a_2$ corresponds to exactly two color transitions. In situations where two or more color transitions occur within the segment of pixel data that corresponds to N bits of N-bit buffer 108, the distance $a_0a_2$ may be found in a single look-up operation. In such situations $a_0a_2$ is equal to $L_2$. However, in some cases a single look-up operation in the data look-up table 112 (see FIG. 2) will define less than two color transition points. In such cases, the system 100 must track the values for $L_1$, $L_2$, and the total length value in each look-up operation until exactly two color transitions occur. The system 100 counts the number of color transitions, if any, that occur in each look-up using $L_1$ and $L_2$ and uses the total length value to advance the pointer 114 along the bit stream after each look-up as described above. The system 100 also accumulates the values for the length $a_0a_2$ based on the values $L_1$ and $L_2$, and the total length until exactly two color transitions have occurred.

Figure 7:
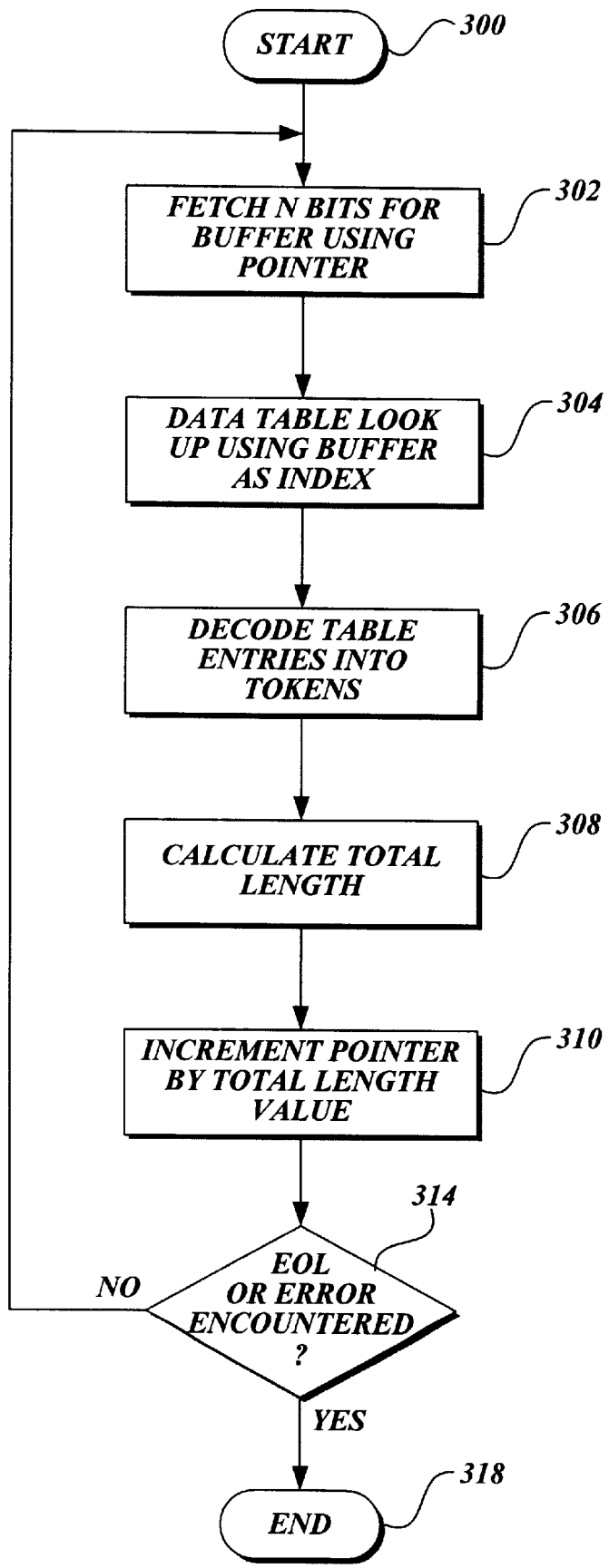
FIG. 7 is a flowchart illustrating the operation of the system of FIG. 2.

The operation of the system 100 is illustrated in the flowchart of FIG. 7. At a start 300, the encoded data is stored in the encoded data storage area 106 (see FIG. 2). In step 302, the system 100 fetches N bits of data from the encoded data storage area 106 using the pointer 114. In step 304, the system performs a data table look-up using the N-bit buffer 108 as an index to the data look-up table 112. In step 306, the system 100 decodes the data table entries into tokens. While the specific data table entry illustrated in FIG. 5A, FIG. 5B, and FIG. 6 are directed to facsimile operation, those of ordinary skill in the art will readily recognize that the system 100 may be used to decode any bit stream encoded with variable length codes where an N-bit buffer is used as an indicator to a location in a data structure. Following the decoding operation, the decoded tokens may be stored in the token storage area 116 (see FIG. 2) or transmitted directly to the facsimile processor 120 for processing with the print engine 122.

In step 308, the system 100 calculates the total length of data bits from the N-bit buffer 108 that were used to represent the one or more decoded tokens in the data look-up table 112. In step 310, the system 100 increments the pointer 114 by the value of the total length. In decision 314, the system determines whether an EOL or an error tokens were encountered. If the EOL or the error tokens were encountered, the result of decision 314 is yes and the system ends the processing for a single horizontal scan line at 318. If the EOL and the error tokens were not encountered, the result of decision 314 is no and the system 100 returns to step 302 to fetch an additional N bits using the incremented value in the pointer 114. In this manner, the system 100 can rapidly decode the bit stream encoded with variable length codes using an N-bit buffer as an index to a data look-up table thus avoiding the need to perform a data look-up operation for each bit in the variable length code.

It is to be understood that even though various embodiments and advantages of the present invention have been set forth in the foregoing description, the above disclosure is illustrative only, and changes may be made in detail, yet remain within the broad principles of the invention. For example, the N-bit buffer 108 may have a buffer length that is less than the maximum length for the variable length code. In that event, a single data look-up operation may not always result in a valid decoded token. However, the data within the data look-up table 112 may be used in conjunction with a conventional binary search tree. In this embodiment, the system 100 still saves N data look-up operations that would otherwise have to be performed by a conventional binary search tree. In addition, the pointer 114 may be any form of indicator pointing to a location within the data look-up table 112. Furthermore, any suitable data structure may be used in place of the data look-up table 112. Furthermore, each entry in a data look-up table 112 may include an additional indicator indicating the data look-up table (black or white in case of facsimile decoding) to be used to decode the next portion of encoded bit stream from the encoded data storage area 106. Therefore, the present invention is to be limited only by the appended claims.

What is claimed is:

1. A method for the decoding of data encoded using variable length codes and stored in a storage area, the method comprising the steps of:

indicating a data location within the data storage area;

indicating a predetermined number of data bits of the data from the data storage area starting at said indicated data location; and directly using the contents of the data storage area corresponding to said predetermined number of data bits as an index in a single indexed memory look-up operation to indicate a location in a data structure containing a set of decoded tokens corresponding to the variable length codes without performing any additional data processing prior to said indexed memory operation, said data structure location containing at least a first decoded token corresponding to a portion of said predetermined number of data bits and a number indicative of the number of bits in said portion.

2. The method of claim 1, further including the step of indicating a new data location within the data storage area, said step indicating said predetermined number of data bits starting at said new data location to thereby decode additional data contained within the storage area.

3. The method of claim 2 wherein said step of indicating said data location further comprises adjusting said indicator by adding said number to indicate said new data location, whereby said predetermined number of data bits subsequently indicated in the storage area are used to indicate a new location in said data structure.

4. The method of claim 1 wherein the variable length codes have a maximum code length and said predetermined number is at least as large as the maximum code length.

5. The method of claim 1 wherein the storage area stores the data encoded with variable length codes using a predetermined memory model and said data structure is constructed to use said predetermined memory model to thereby directly use said predetermined number of extracted data bits.

6. The method of claim 1 for use with a plurality of data structures each of which includes additional data indicative of which of said plurality of data structures will be used to decode additional data in the data storage area, said step of using said predetermined number of data bits indicating said location in a first of said plurality of data structures, the method further including the step of using said additional data in said location in said first data structure to determine which of said plurality of data structures will be used to decode additional data in the data storage area.

7. The method of claim 1 wherein the data encoded with variable length codes in the storage area is facsimile data and said decoded tokens correspond to pixel data in a facsimile image.

8. The method of claim 7 wherein said decoded tokens correspond to black pixel data and white pixel data and wherein one of said plurality of data structures comprises a black data structure for use when a last decoded token was a white terminating token and wherein one of said plurality of data structures comprises a white data structure for use when said last decoded token was a black terminating token.

9. The method of claim 8 wherein said data structures include additional data indicative of which of said black and white data structures will be used to decode additional data in the data storage area, said step of using said predetermined number of data bits indicating said location in a first of said black and white data structures, the method further including the step of using said additional data in said location in said first data structure to determine which of said black and white data structures will be used to decode additional data in the data storage area.

10. A system for the decoding of data encoded using variable length codes, the system comprising:

a data storage area containing the encoded data;

a first data indicator to indicate a data location within said data storage area;

a second data indicator including a predetermined number of data bits extracted in a single indexed memory look-up operation from said data storage area starting at said data location indicated by said first data indicator;

a data structure having a location directly indicated by said second indicator without performing any additional data processing prior to said indexed memory operation and containing at said data structure location a plurality of decoded tokens corresponding to a portion of said predetermined number of data bits, said data structure location further containing a number corresponding to said portion of data bits represented by said plurality of decoded tokens; and a counter for incrementing said first indicator by said number to create an altered first data indicator, and to thereby permit the extraction of the predetermined number of data bits from said data storage area starting at said data location indicated by said altered first data indicator using said single indexed memory operation.

11. The system of claim 10 wherein the variable length codes have a maximum code length and said predetermined number is at least as large as the maximum code length.

12. The system of claim 10 wherein said data storage area stores the variable length codes using a predetermined memory model and said data structure is constructed to use said predetermined memory model to thereby directly use said predetermined number of extracted data bits.

13. The system of claim 10 wherein the data in said data storage area is facsimile data and said decoded tokens correspond to pixel data in a facsimile image.

14. The system of claim 13 wherein said decoded tokens correspond to black pixel data and white pixel data and wherein one of said plurality of data structures comprises a black data structure for use when a last decoded token was a white terminating token and wherein one of said plurality of data structures comprises a white data structure for use when said last decoded token was a black terminating token.

15. The system of claim 14 wherein said data structures include additional data indicative of which of said black and white data structures will be used to decode additional data in the data storage area, said second indicator indicating said location in a first of said black and white data structures and said new second indicator using said additional data to indicate which of said black and white data structures will be used to decode additional data in the data storage area.

16. A system for the decoding of facsimile data encoded using variable length codes, the system comprising:

a data storage area containing the facsimile data encoded using variable length codes in accordance with an industry standard format;

a data indicator to indicate a data location of a predetermined number of data bits of the facsimile data within said data storage area; and a data structure containing decoded tokens corresponding to the facsimile data, the contents of the data storage area corresponding to said predetermined number of data bits being directly used in a single indexed memory look-up operation to indicate a location in said data structure containing at least a first decoded token corresponding to a portion of said predetermined number of data bits without performing any additional processing prior to said indexed memory operation.

17. The system of claim 16, further including count means for determining a number corresponding to said portion of said predetermined number of data bits and adjusting said indicator to permit the indication of a new data location of said predetermined number of data bits of the facsimile data within said data storage area and thereby decode additional facsimile data contained within said data storage area.

18. The system of claim 17 wherein said count means adjusts said indicator by adding said number to said indicator to permit the subsequent indication of said predetermined number of data bits of the facsimile data starting at said new data location, whereby said predetermined number of data bits subsequently indicated in said data storage area are used to indicate a new location in said data structure.

19. The system of claim 17 wherein said data structure contains additional data indicative of said number, said count means using said additional data to adjust said indicator.

20. The system of claim 16 wherein the facsimile data have a maximum code length and said predetermined number is at least as large as the maximum code length.

21. The system of claim 16 wherein said data storage area stores the facsimile data using a predetermined memory model and said data structure is constructed to directly use said predetermined memory model.

22. The system of claim 16 wherein said decoded tokens correspond to black pixel data and white pixel data and wherein one of said plurality of data structures comprises a black data structure for use when a last decoded token was a white terminating token and wherein one of said plurality of data structures comprises a white data structure for use when said last decoded token was a black terminating token.

23. The system of claim 22 wherein said black and white data structures include additional data indicative of which of said black and white data structures will be used to decode additional data in the data storage area, said predetermined number of bits indicating said location in a first of said black and white data structures and said indicator indicates a new data location of said predetermined number of data bits of the facsimile data within said data storage area using said additional data to indicate which of said black and white data structures will be used to decode additional data in the data storage area.

24. A system for the decoding of data encoded using variable length codes, the system comprising:
 a data storage area to store the encoded data;
 an indicator to indicate a location of a predetermined number of data bits of the encoded data within said data storage area; and
 a data structure containing decoded tokens corresponding to a decoded version of the encoded data, said predetermined number of data bits of the encoded data at said location being directly used as an index in a single indexed memory look-up operation to directly indicate a location in said data structure containing at least a first decoded token corresponding to a portion of said predetermined number of data bits without performing any additional data processing prior to said indexed memory operation, said data structure location further including a number corresponding to said portion of said predetermined number of data bits.

25. The system of claim 24, further including count means for adjusting said indicator to include said number and thereby permit the indication of a new data location in said data storage area to reform said predetermined number of data bits and thereby decode an additional portion of the encoded data contained within said data storage area.

26. The system of claim 24 wherein the variable length codes have a maximum code length and said predetermined number is at least as large as the maximum code length.

27. The system of claim 24 wherein the variable length codes are stored using a predetermined memory model an said data structure is constructed to directly use said predetermined memory model.

28. A computer readable media containing instructions for the decoding of data encoded using variable length codes and stored in a storage area, the computer readable media comprising instructions that cause the computer to perform the steps of:
 indicating a data location within the data storage area;
 extracting a predetermined number of data bits of the data from the data storage area in parallel starting at said indicated data location; and
 directly using the contents of the data storage area corresponding to said predetermined number of data bits as an index in a single indexed memory look-up operation to directly indicate a location in a data structure containing decoded tokens corresponding to a decoded version of the data without performing any additional data processing prior to said indexed memory operation, said data structure location indicated by said predetermined number of data bits containing at least a first decoded token corresponding to a portion of said predetermined number of data bits and containing a number corresponding to said portion.

29. The computer readable media of claim 28, further including computer instructions to cause the computer to perform the step of indicating by adding said number corresponding to said portion to an indicator to permit the subsequent indication of a new data location within the data storage area.

30. The computer readable media of claim 28 wherein the variable length codes have a maximum code length and said predetermined number is at least as large as the maximum code length.

31. The computer readable media of claim 28 wherein the storage area stores the data using a predetermined memory model and said data structure is constructed to directly use said predetermined memory model.

32. The computer readable media of claim 28 wherein the encoded data in the storage area is facsimile data and said decoded tokens correspond to pixel data in a facsimile image.

33. The computer readable medium of claim 32 wherein said decoded tokens correspond to black pixel data and white pixel data and wherein one of said plurality of data structures comprises a black data structure for use when a last decoded token was a white terminating token and wherein one of said plurality of data structures comprises a white data structure for use when said last decoded token was a black terminating token.

34. The computer readable media of claim 33 wherein said black and white data structures include additional data indicative of which of said black and white data structures will be used to decode additional data in the data storage area, said step of indicating said location in said data structure indicating said location in a first of said black and white data structures and using said additional data to indicate which of said black and white data structures will be used to decode additional data in the data storage area.

35. The method of claim 1 wherein using said predetermined number of data bits in a parallel look-up operation comprises using said predetermined number of data bits in a parallel look-up operation to directly indicate without additional data processing a location in a data structure containing a set of decoded tokens corresponding to a portion of said predetermined number of data bits and a number indicative of the number of bits used to present said set of decoded tokens.

36. The method of claim 35 wherein said set of decoded tokens comprises two decoded tokens.

37. The method of claim 35 wherein said set of decoded tokens comprises three decoded tokens.

38. The method of claim 35 wherein said set of decoded tokens comprises four decoded tokens.

39. The method of claim 35 wherein said set of decoded tokens comprises three decoded tokens on average.

40. A method for the decoding of black and white pixel data in a facsimile image encoded using variable length codes and stored in a storage area, the method comprising the steps of:

indicating a data location within the data storage area;

indicating a predetermined number of data bits of the data stored in the data storage area starting at said indicated data location;

using said predetermined number of data bits in a parallel look-up operation when a last decoded token was a black terminating token to directly indicate without additional data processing a location in a white data structure containing a set of decoded tokens corresponding to the white pixel data in a facsimile image, said data structure location containing at least a first decoded token corresponding to a portion of said predetermined number of data bits and a number indicative of the number of bits in said portion; and using said predetermined number of data bits in a parallel look-up operation when a last decoded token was a white terminating token to directly indicate without additional data processing a location in a black data structure containing a set of decoded tokens corresponding to the black pixel data in a facsimile image, said data structure location containing at least a first decoded token corresponding to a portion of said predetermined number of data bits and a number indicative of the number of bits in said portion.

41. A method for the decoding of black and white pixel data in a facsimile image encoded using variable length codes and stored in a storage area, the method comprising the steps of:

indicating a data location within the data storage area;

indicating a predetermined number of data bits of the data stored in the data storage area starting at said indicated data location;

using said predetermined number of data bits in a parallel look-up operation when a last decoded token was a black terminating token to directly indicate without additional data processing a location in a white data structure containing a set of decoded tokens corresponding to the white pixel data in a facsimile image, said data structure location containing at least a first decoded token corresponding to a portion of said predetermined number of data bits and a number indicative of the number of bits in said portion;

using said predetermined number of data bits in a parallel look-up operation when a last decoded token was a white terminating token to directly indicate without additional data processing a location in a black data structure containing a set of decoded tokens corresponding to the black pixel data in a facsimile image, said data structure location containing at least a first decoded token corresponding to a portion of said predetermined number of data bits and a number indicative of the number of bits in said portion; and using additional data indicative of which of said black and white data structures will be used to decode additional data in the data storage area also contained in said data structure location to determine which of said black and white data structures will be used to decode additional data in the data storage area.

42. A system for the decoding of facsimile data encoded using variable length codes, the system comprising:

a data storage area containing the encoded facsimile data;

a first data indicator to indicate a data location within said data storage area;

a second data indicator including a predetermined number of data bits extracted in a parallel look-up operation from said data storage area starting at said data location indicated by said first data indicator;

a black data structure for use when said last decoded token was a white terminating token having a location directly indicated by said second data indicator without additional data processing and containing at said data structure location a plurality of decoded tokens corresponding to black pixel data in a facsimile image and also corresponding to a portion of said predetermined number of data bits, said data structure location further containing a number corresponding to said portion of data bits represented by said plurality of decoded tokens;

a white data structure for use when said last decoded token was a black terminating token having a location directly indicated by said second data indicator without additional data processing and containing at said data structure location a plurality of decoded tokens corresponding to white pixel data in a facsimile image and also corresponding to a portion of said predetermined number of data bits, said data structure location further containing a number corresponding to said portion of data bits represented by said plurality of decoded tokens; and a counter for incrementing said first indicator by said number to create an altered first data indicator, and to thereby permit the parallel extraction of the predetermined number of data bits from said data storage area starting at said data location indicated by said altered first data indicator.

43. A system for the decoding of facsimile data encoded using variable length codes, the system comprising:

a data storage area containing the encoded facsimile data;

a first data indicator to indicate a data location within said data storage area;

a second data indicator including a predetermined number of data bits extracted in a parallel look-up operation from said data storage area starting at said data location indicated by said first data indicator and indicating a location in a first of a black or white data structures;

a black data structure for use when said last decoded token was a white terminating token having a location directly indicated by said second data indicator without additional data processing and containing at said data structure location a plurality of decoded tokens that correspond to black pixel data in a facsimile image and to a portion of said predetermined number of data bits, said data structure location further containing a number corresponding to said portion of data bits represented by said plurality of decoded tokens, said black data structure further comprising additional data indicative of which of said black and white data structures will be used to decode additional data in the data storage area;

a white data structure for use when said last decoded token was a black terminating token having a location directly indicated by said second data indicator without additional data processing and containing at said data structure location a plurality of decoded tokens that correspond to white pixel data in a facsimile image and to a portion of said predetermined number of data bits, said data structure location further containing a number corresponding to said portion of data bits represented by said plurality of decoded tokens, said white data structure further comprising additional data indicative of which of said black and white data structures will be used to decode additional data in the data storage area; and a counter for incrementing said first indicator by said number to create an altered first data indicator, and to thereby permit the parallel extraction of the predetermined number of data bits from said data storage area starting at said data location indicated by said altered first data indicator.

44. A system for the decoding of facsimile data encoded using variable length codes, the system comprising:

a data storage area containing the facsimile data encoded using variable length codes in accordance with an industry standard format;

a data indicator to indicate a data location of a predetermined number of data bits of the facsimile data within said data storage area;

a white data structure for use when a last decoded token was a black terminating token containing decoded tokens corresponding to white pixel data, said predetermined number of data bits being used in a parallel look-up operation to directly indicate without additional data processing a location in said white data structure containing at least a first decoded token corresponding to a portion of said predetermined number of data bits; and a black data structure for use when a last decoded token was a white terminating token containing decoded tokens corresponding to black pixel data, said predetermined number of data bits being used in a parallel look-up operation to directly indicate without additional data processing a location in said black data structure containing at least a first decoded token corresponding to a portion of said predetermined number of data bits.

45. A system for the decoding of facsimile data encoded using variable length codes, the system comprising:

a data storage area containing the facsimile data encoded using variable length codes in accordance with an industry standard format;

a data indicator to indicate a data location of a predetermined number of data bits of the facsimile data within said data storage area, said predetermined number of bits indicating said location in a first of a black and white data structures;

a white data structure for use when a last decoded token was a black terminating token containing decoded tokens corresponding to white pixel data, said predetermined number of data bits being used in a parallel look-up operation to directly indicate without additional data processing a location in said white data structure containing at least a first decoded token corresponding to a portion of said predetermined number of data bits, wherein said white data structure further includes additional data indicative of which of said black and white data structures will be used to decode additional data in the data storage area; and a black data structure for use when a last decoded token was a white terminating token containing decoded tokens corresponding to black pixel data, said predetermined number of data bits being used in a parallel look-up operation to directly indicate without additional data processing a location in said black data structure containing at least a first decoded token corresponding to a portion of said predetermined number of data bits, wherein said white data structure further includes additional data indicative of which of said black and white data structures will be used to decode additional data in the data storage area, and wherein said predetermined number of bits indicating said location in a first of said black and white data structures and said indicator indicates a new data location of said predetermined number of data bits of the facsimile data within said data storage area using said additional data to indicate which of said black and white data structures will be used to decode additional data in the data storage area.

46. A computer readable media containing instructions for the decoding of facsimile data encoded using variable length codes and stored in a storage area, the computer readable media comprising instructions that cause the computer to perform the steps of:

indicating a data location within the data storage area;

extracting a predetermined number of data bits of the facsimile data from the data storage area in parallel starting at said indicated data location;

using said predetermined number of data bits in a parallel look-up operation without additional data processing to indicate a location in a black data structure for use when a last decoded token was a white terminating token containing decoded tokens corresponding to black pixel data in a facsimile image, said data structure location indicated by said predetermined number of data bits containing at least a first decoded token corresponding to a portion of said predetermined number of data bits and containing a number corresponding to said portion; and using said predetermined number of data bits in a parallel look-up operation without additional data processing to indicate a location in a white data structure for use when said last decoded token was a black terminating token containing decoded tokens corresponding to white pixel data in a facsimile image, said data structure location indicated by said predetermined number of data bits containing at least a first decoded token corresponding to a portion of said predetermined number of data bits and containing a number corresponding to said portion.

47. A computer readable media containing instructions for the decoding of facsimile data encoded using variable length codes and stored in a storage area, the computer readable media comprising instructions that cause the computer to perform the steps of:

indicating a data location within the data storage area;

extracting a predetermined number of data bits of the facsimile data from the data storage area in parallel starting at said indicated data location;

using said predetermined number of data bits in a parallel look-up operation without additional data processing to indicate a location in a black data structure for use when a last decoded token was a white terminating token containing decoded tokens corresponding to black pixel data in a facsimile image and data indicative of which of said black and white data structures will be used to decode additional data in the data storage area, said data structure location indicated by said predetermined number of data bits containing at least a first decoded token corresponding to a portion of said predetermined number of data bits and containing a number corresponding to said portion; and using said predetermined number of data bits in a parallel look-up operation without additional data processing to indicate a location in a white data structure for use when said last decoded token was a black terminating token containing decoded tokens corresponding to white pixel data in a facsimile image and data indicative of which of said black and white data structures will be used to decode additional data in the data storage area, said data structure location indicated by said predetermined number of data bits containing at least a first decoded token corresponding to a portion of said predetermined number of data bits and containing a number corresponding to said portion, and wherein said additional data is utilized to indicate which of said black and white data structures will be used to decode additional data in the data storage area.

* * * * *

UNITED STATES PATENT AND TRADEMARK OFFICE
CERTIFICATE OF CORRECTION

PATENT NO. : 6,385,341 B1
DATED : May 7, 2002
INVENTOR(S) : R. Lisitsa et al.

It is certified that error appears in the above-identified patent and that said Letters Patent is hereby corrected as shown below:

Column 1,
Line 33, "table that require" should read -- table that requires --

Column 2,
Line 20, "structures each" should read -- structures, each --
Line 22, "decode next" should read -- decode a next --
Line 22, "of encoded" should read -- of the encoded --

Column 3,
Line 15, "is governed" should read -- are governed --
Line 23, "codes, indicate" should read -- codes, indicates --

Column 5,
Line 22, "result in only fourteen" should read -- result in multiple tokens corresponding to only fourteen --
Line 65, "MH or MR for" should read -- MH of MR format for --

Column 7,
Line 12, "(ie., 11)" should read -- (i.e., 11) --

Column 8,
Line 39, "with the CCITT" should read -- within the CCITT --

Column 10,
Line 29, "an EOL or an error tokens" should read -- EOL or error tokens --
Line 35, "an additional N" should read -- additional N --
Line 39, "table thus" should read -- table, thus --

Column 11,
Line 16, "claim 1," should read -- claim 1 --
Line 36, "structures each" should read -- structures, each --

Column 13,
Line 59, "claim 24," should read -- claim 24 --

Column 14,
Line 2, "model an" should read -- model and --
Line 26, "claim 28," should read -- claim 28 --

UNITED STATES PATENT AND TRADEMARK OFFICE
CERTIFICATE OF CORRECTION

PATENT NO.    : 6,385,341 B1
DATED         : May 7, 2002
INVENTOR(S)   : R. Lisitsa et al.

It is certified that error appears in the above-identified patent and that said Letters Patent is hereby corrected as shown below:

<u>Column 16,</u>
Line 54, "a black or white data structures;" should read -- a black or white data structure; --

<u>Column 17,</u>
Line 56, "first of a black and" should read -- first of black and --

Signed and Sealed this

Twenty-seventh Day of May, 2003

JAMES E. ROGAN
*Director of the United States Patent and Trademark Office*